(12) United States Patent
Chan

(10) Patent No.: US 6,314,574 B1
(45) Date of Patent: *Nov. 6, 2001

(54) INFORMATION DISTRIBUTION SYSTEM

(76) Inventor: Hark Chan, 861 Brent Dr., Cupertino, CA (US) 95014

( * ) Notice: Subject to any disclaimer, the term of this patent is extended or adjusted under 35 U.S.C. 154(b) by 0 days.

This patent is subject to a terminal disclaimer.

(21) Appl. No.: 09/188,157

(22) Filed: Nov. 8, 1998

Related U.S. Application Data

(63) Continuation-in-part of application No. 08/939,368, filed on Sep. 29, 1997, now Pat. No. 6,021,307, which is a continuation of application No. 08/644,838, filed on May 10, 1996, now abandoned, which is a continuation of application No. 08/279,424, filed on Jul. 25, 1994, now abandoned, and a continuation-in-part of application No. 08/255,649, filed on Jun. 8, 1994, now abandoned.

(51) Int. Cl.$^7$ ........................................ H04H 1/00
(52) U.S. Cl. ................................ 725/66; 725/110
(58) Field of Search ................ 455/3.1; 725/66, 725/110

(56) References Cited

U.S. PATENT DOCUMENTS

| | | |
|---|---|---|
| 3,824,597 | 7/1974 | Berg . |
| 3,967,202 | 6/1976 | Batz . |
| 4,081,832 | 3/1978 | Sherman . |
| 4,191,860 | 3/1980 | Weber . |
| 4,307,416 | 12/1981 | Spano . |
| 4,563,702 | 1/1986 | Heller . |
| 4,635,113 | 1/1987 | Okada et al. . |
| 4,734,858 | 3/1988 | Sclafy .......................... 364/408 |
| 4,742,544 | 5/1988 | Kupnicki et al. ................ 380/14 |
| 4,827,508 | 5/1989 | Shear . |
| 4,965,825 | 10/1990 | Harvey et al. . |
| 5,010,571 | 4/1991 | Katznelson . |
| 5,128,981 | 7/1992 | Tsukamoto et al. ............... 379/58 |
| 5,132,680 | 7/1992 | Tezuka et al. ................ 340/825.08 |
| 5,185,794 | 2/1993 | Thompson et al. ................ 380/17 |
| 5,208,671 | 5/1993 | Tarrant ......................... 358/147 |
| 5,208,857 | 5/1993 | Lebrat ........................... 380/14 |
| 5,237,411 | 8/1993 | Fink et al. ..................... 358/146 |
| 5,239,540 | 8/1993 | Rovira et al. .................... 370/77 |
| 5,247,347 | 9/1993 | Litteral et al. . |
| 5,247,575 | 9/1993 | Sprague et al. . |
| 5,319,707 | 6/1994 | Wasilewski et al. .............. 380/14 |
| 5,321,748 | 6/1994 | Zeidler et al. ................... 380/14 |
| 5,321,750 | 6/1994 | Nadan ........................... 380/20 |
| 5,323,148 | 6/1994 | Olazabal et al. ............. 340/825.44 |
| 5,327,174 | 7/1994 | Kim ............................. 348/468 |

(List continued on next page.)

OTHER PUBLICATIONS

David Raggett, HTML+(Hypertext Markup Language), pp. 1–31, Jul. 12, 1993, WWW Discussion Group Request for Comments.

John P. Hayes, "Computer Architecture and Organization", pp. 398–421, Jan. 1988.

Yoshiko Hara, "Consortium Eyes Satellite–Based–E–Book System", Electronic Engineering Times, Oct., 1998.

(List continued on next page.)

Primary Examiner—William Cumming

(57) ABSTRACT

An information distribution system encodes a first set of digital data on a plurality of portable read-only storage devices. Additional information is stored in a database that is accessible by using a bi-directional channel. The first set of digital data contains a plurality of special displayable terms, a first non-displayable symbol, a plurality of linkage references, and a second non-displayable symbol. A user can select at least one special displayable term. The linking reference associated with the selected special displayable term is sent to the database via the bi-directional channel. The database uses the linking reference to search for information, and returns the resulting information to the user.

51 Claims, 4 Drawing Sheets

U.S. PATENT DOCUMENTS

| | | | |
|---|---|---|---|
| 5,335,275 | 8/1994 | Millar et al. | 380/4 |
| 5,335,278 | 8/1994 | Matchett et al. | 380/23 |
| 5,343,494 | 8/1994 | Averst et al. | 375/1 |
| 5,361,399 | 11/1994 | Linquist et al. | 455/561 |
| 5,377,266 | 12/1994 | Katta et al. | 380/20 |
| 5,388,101 | 2/1995 | Dinkins | 370/95.1 |
| 5,392,023 | 2/1995 | D'Avello et al. | 379/100 |
| 5,392,353 | 2/1995 | Morales | 380/20 |
| 5,432,798 | 7/1995 | Blair | 371/32 |
| 5,444,769 | 8/1995 | Koen et al. | 379/94 |
| 5,452,356 | 9/1995 | Albert | 380/9 |
| 5,539,449 | 7/1996 | Blahut et al. | 348/7 |
| 5,629,867 | 5/1997 | Goldman | 364/514 |
| 5,887,243 | 3/1999 | Harvey et al. | 455/3.1 |
| 5,995,725 | 11/1999 | Dillon | 395/200.33 |
| 6,021,307 * | 2/2000 | Chan | 455/3.1 |
| 6,188,869 * | 2/2001 | Chan | 455/3.1 |

OTHER PUBLICATIONS

S. Deering, "Host Extensions for IP Multicasting", pp. 1–17, Aug. 1989, Network Working Group, Request for Comments: 1112.

Cricket Liu, et al., "Managing Internet Information Services", pp. 279–298, Dec., 1994, O'Reilly & Associates, Inc.

* cited by examiner

K-S Particle Found

Two physicists announced that they had found the
K-S particle. If confirmed, this will verify the theory
of the Nobel laureates, Professors Kendrick Chan
and Sophia Chan, who first postulated the existence
of the K-S particle ten years ago. The physicists,
Drs. Lisa Smith and John Doe, showed computer
generated results indicating the detection of the K-S
particles in a series of experiments carried out at the
International Super-High Energy Accelerator.

FIG. 2A

K-S Particle Found¶ ¶   Two physicists announced that
they had found the ˈϒˈK-S particleˈϒˈ⌘FE330AB⌘. If
confirmed, this will verify the theory of the Nobel
laureates, Professors ˈϒˈKendrick Chanˈϒˈ⌘A245DC8⌘ and
ˈϒˈSophia Chanˈϒˈ⌘85AC258⌘, who first postulated the
existence of the K-S particle ten years ago. The
physicists, Drs. ˈϒˈLisa Smithˈϒˈ⌘3098BE6z⌘ and ˈϒˈJohn
Doeˈϒˈ⌘EAC7835⌘, showed computer generated results
indicating the detection of the K-S particles in a series
of experiments carried out at the ˈϒˈInternational Super-
High Acceleratorˈϒˈ⌘C347A49⌘.¶

FIG 2B

INFORMATION DISTRIBUTION SYSTEM

This application is a continuation in part of application Ser. No. 08/939,368 filed Sep. 29, 1997, now U.S. Pat. No. 6,021,307, which is a continuation in part of application Ser. No. 08/644,838 filed May 10, 1996, now abandoned, which is a continuation in part of application Ser. No. 08/279,424 filed Jul. 25, 1994, now abandoned, and application Ser. No. 08/255,649 filed Jun. 8, 1994, now abandoned. These four patent applications are incorporated herein by reference.

FIELD OF THE INVENTION

This invention relates generally to information distribution, and more particularly to distributing information using a broadcast channel and a bi-directional communication channel.

BACKGROUND OF THE INVENTION

Recent advancements in modem and computer technology allow large amount of digital data to be transmitted electronically. A number of information providers (such as newspaper and magazine publishers) and on-line information distributors have formed partnerships to deliver newspaper and other information on-line. In this system, a subscriber uses a computer and a modem to connect, through a regular phone line, to the computer of an on-line information provider. The subscriber can retrieve information, including newspaper articles, stored in the computer of the information provider.

On-line delivery of newspaper has many advantages. For example, the information can be updated throughout the day while the printed version is printed only once or twice a day. Further, it is possible to do text-based searches on the information. However, it is found that on-line deliver of newspaper and other information is slow. For example, a subscriber has to wait many seconds for a newspaper article to be delivered. The quality of the electronic newspaper is low. For example, in order to reduce storage and communication requirements, graphic images appeared in the printed version are not universally supplied in the on-line version of newspaper. One of the reasons for such poor performance is the limited bandwidth of communication channels used by on-line information distributors. Another reason is that information is centrally processed by the computer at the site of the information distributor, with the result that each subscriber only gets a small slice of the time of the computer.

SUMMARY OF THE INVENTION

The present invention uses two channels to deliver digital information: a broadcast channel and a bidirectional channel. The broadcast channel is used to deliver the bulb of the digital information to subscribers. The amount of information delivered is preferably sufficient to satisfy the needs of a large number of subscribers so that they do not have to obtain additional information using the bi-directional channel. The broadcasted information is stored on fast storage media located at subscriber sites. As a result, search and retrieval of the broadcasted information is quick. Further, the broadcasted information is processed locally using a dedicated on-site processor instead of relying on the computers of the information distributors. As a result, the load on the computers of the information distributors is reduced. If the subscribers desire to receive additional information relating to the broadcasted information, the bi-directional communication channel is used to transmit the request and the requested information.

The distribution costs of broadcast channels are typically much lower than that of a bi-directional communication channel. Consequently, the major portion of information is delivered using low cost distribution channels. For a large number of subscribers, the broadcasted information will provide all the information they normally need. Thus, expensive bi-directional communication channels are used only occasionally.

These and other features and advantages of the present invention will be fully understood by referring to the following detailed description in conjunction with the accompanying drawings.

BRIEF DESCRIPTION OF THE DRAWINGS

FIG. 2A shows a newspaper article as displayed on a monitor of the information distribution system shown in FIG. 1.

FIG. 2B shows the contents of the broadcast information that corresponds to the newspaper article of FIG. 2A.

DETAILED DESCRIPTION OF THE INVENTION

Figure 1:
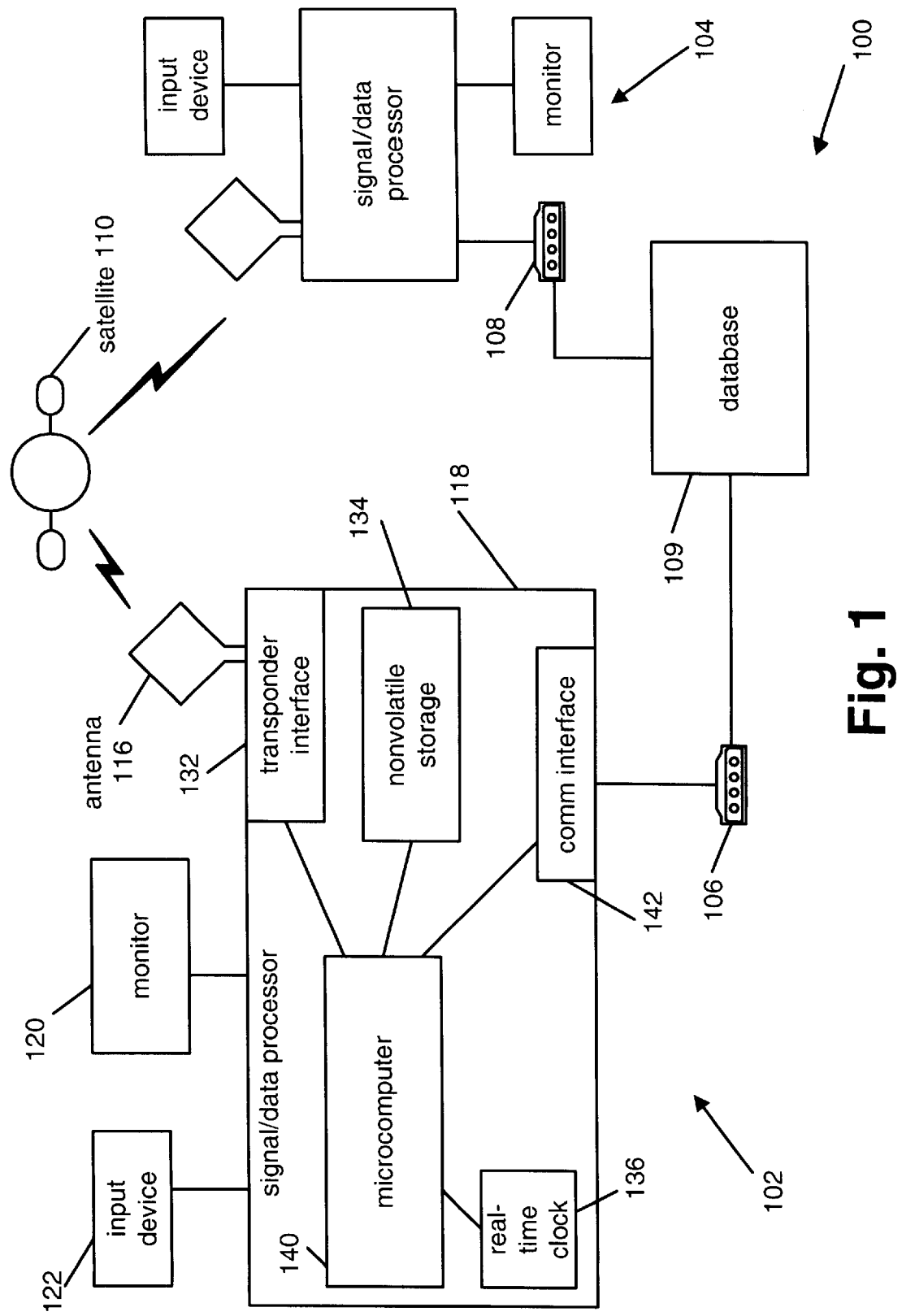
FIG. 1 is a schematic drawing showing an information distribution system of the present invention.

FIG. 1 is a block diagram of an information distribution system 100 in accordance with the present invention. In this embodiment, system 100 is designed to electronically distribute newspaper. It should be pointed out that system 100 can also be used advantageously to distribute other types of information. System 100 contains a plurality of subscriber units (such as units 102 and 104) each connected to a bi-directional communication channel (e.g., telephone connections 106 and 108 coupled to units 102 and 104, respectively) and a satellite transponder 110 for broadcasting digital data to these subscriber units. Telephone connections 106 and 108 (which could be line-based or wireless) are coupled to a central database 109. In system 100, satellite transponder 110 is used to broadcast the content of a newspaper to the subscriber units while telephone connections 106 and 108 are used to provide additional information (stored in central database 109) to subscriber units 102 and 104, respectively, on a demand basis.

The structures of these subscriber units are substantially identical; consequently, only one of these units, such as unit 102, is described in detail. Unit 102 contains an antenna 116 for receiving broadcast signals from satellite transponder 110, a signal/data processor 118 for performing signal and data processing functions, a monitor 120 for displaying the electronic newspaper, and an input device 122 (such as a keyboard and/or a mouse).

Signal/data processor 118 contains a transponder interface 132 for processing transponder signal received from antenna 116. Transponder interface 132 typically contains a low noise receiver for receiving high frequency (e.g., C or Ku band) transponder signal and a "universal data interface" for converting the transponder signal to digital data. The retrieved data is stored in nonvolatile storage 134, such as a hard disk or solid state flash memory. Preferably, satellite transponder 110 broadcasts the newspaper data at predetermined times. Thus, a real-time clock 136 is preferably used to turn on interface 132 at the predetermined times. Processor 118 contains a microcomputer 140 that coordinates the operation of clock 136, nonvolatile storage 134, and interface 132. Processor 118 also contains a communication interface 142 for sending and receiving digital data from central database 109 through telephone connection 106.

The time for broadcast is preferably chosen when communication load of transponder 110 is at a low level (e.g., around mid-night). As a result, the cost of information delivery is low. Alternatively, the time of broadcasting is chosen by transponder 110 because it knows when communication load is light. In this case, transponder 110 first sends a signal to signal/data processor 118 for alerting processor 118 to receive and process the newspaper information.

A user can use the input device 122 and monitor 120 to read the content of the electronic newspaper stored in nonvolatile storage 134. In this embodiment, the complete content of the newspaper is stored in nonvolatile storage 134. The term "complete content" means that the user is able to read the newspaper without relying on information stored in central database 109 (although other embodiments may deliver less than the complete content). In this aspect, system 100 functions in a similar way as the distribution of a conventional printed newspaper. However, the digital data of the electronic newspaper delivered by satellite transponder 110 preferably contains linkage reference that allows fast retrieval of additional information from central database 109.

If the newspaper information received from satellite transponder 110 is sufficient to satisfy the needs of a user, signal/data processor 118 will not activate telephone connection 106. However, if the user wishes to receive additional information relating to an item mentioned in the electronic newspaper (e.g., by selecting at the item using the input device), process 118 will retrieve the information stored in central database 109 using the embedded linkage reference.

In system 100 of the present invention, the complete content of the electronic newspaper (including graphics and other multimedia contents, if delivered) is stored in nonvolatile storage 134, which has fast access time. Further, a dedicated processor (i.e., microcomputer 140) is used to process newspaper information. On the other hand, prior art on-line newspaper distribution systems rely on modem to deliver the content of the newspaper stored in a central site. Further, the processor in the central site has to serve many users in delivering the newspaper. As a result, system 100 has superior performance compared to the prior art on-line newspaper delivery systems.

If it is desirable to limit circulation of the newspaper to a certain class of subscribers only (e.g., paid subscribers), the data transmitted by transponder 110 could be encrypted. As a result, only subscribers who have a decryption key are able to read the newspaper. In the case, microcomputer 140 also performs decryption functions.

FIG. 2A shows an example of a portion of a newspaper article as seen on monitor 120. In FIG. 2A, the terms that a user may obtain additional information are underlined (or highlighted in other ways, such as setting in different colors, depending on the choice of the publisher). If desired, the user may select these terms using a pointing device, such as a mouse, and signal/data processor 118 will obtain the additional information from central database 109.

FIG. 2B shows the same portion in FIG. 2A as transmitted by transponder 110 (for simplicity, the embedded formatting codes, such as center, bold, etc., are not shown). Each of the terms underlined in FIG. 2A are enclosed by a special symbol (e.g., the "γ" symbol) and followed by a linkage reference enclosed by another special symbol (e.g., the "⌘" symbol). These symbols are invisible to the users and are recognizable only by microcomputer 140.

When an underlined term in FIG. 2A is selected by a user, microcomputer 140 extracts the linkage reference and transmits it to central database 109. The linkage reference allows central database 109 to retrieve the necessary information quickly without doing extensive searches. As a result, the response time of system 100 is fast. The retrieved information can itself contains linkage references and can be searched.

If the speed of searching and retrieving data by central database 109 is fast, it may not be necessary to include linkage reference in the information broadcasted by transponder 110. In this case, the user selects (e.g., using the mouse) words and terms he/she is interested in. Signal/data processor 118 transmits the selected items to central database 109, which searches for matches in its database. Matched information is sent to subscriber unit 102 for processing.

The bi-directional channel also allows updating of the broadcasted information. There is typically a time difference between the broadcast and display of information. New information gathered during this time difference can be stored in central database 109 and later transmitted to signal/data processor 118.

In this embodiment of the present invention, satellite transponder 110 is used as the vehicle to electronically broadcast newspaper. However, other broadcast distribution methods can be used. In the present invention, broadcast is defined as one-to-many distribution of information. The broadcast distribution channels do not have to be electrical. For example, the present invention allows the distribution of compact disc read-only memories (CDROMs) encoded with digital information to the subscriber sites. In the case of electrical broadcast communication channels, both wired and wireless can be used. Preferably, unidirectional channels are used for broadcast because of their low cost; however, the present invention does not preclude the use of bidirectional communication channels (such as telephone lines) as means for distributing broadcast (i.e., one to many) information.

Figure 4:
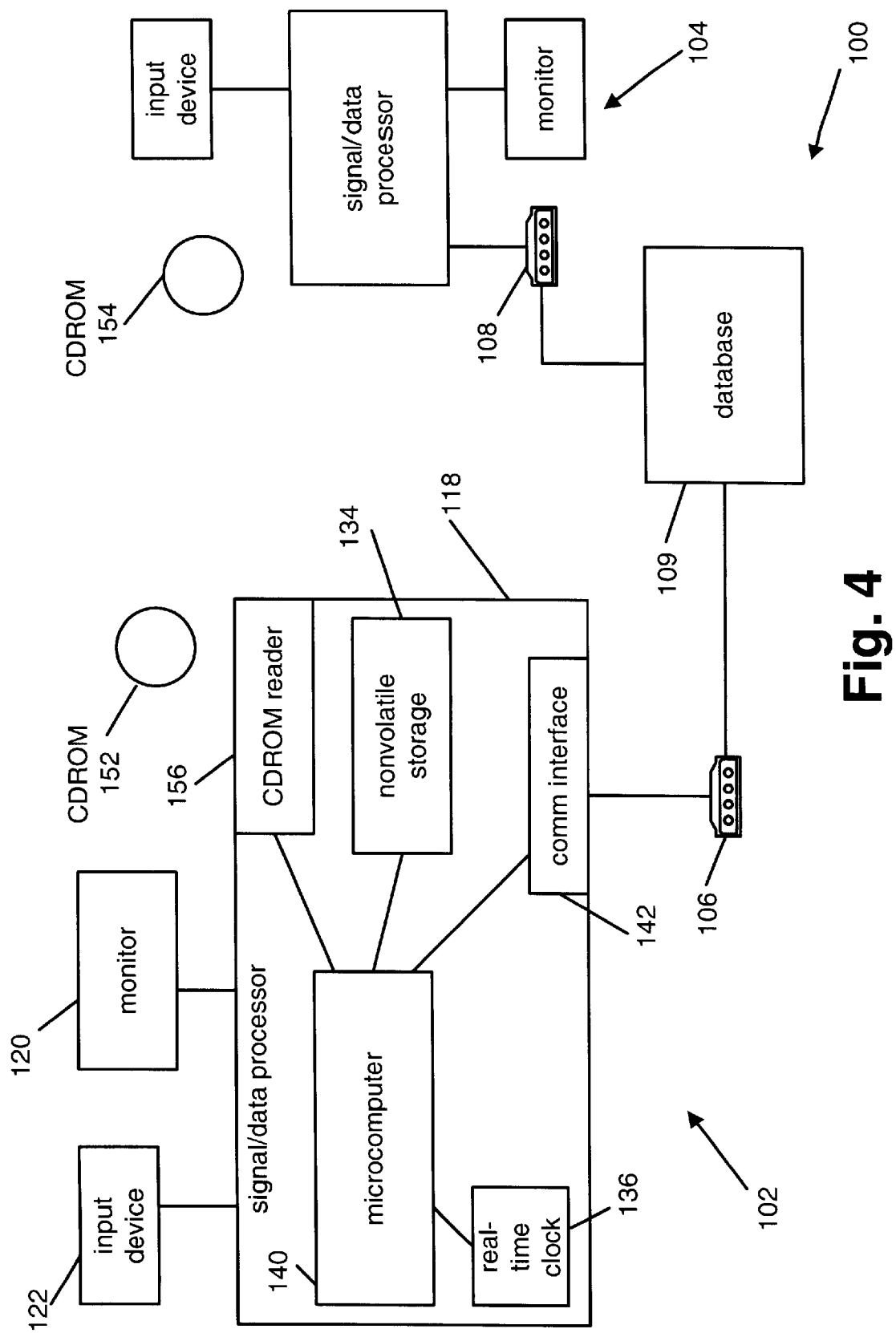
FIG. 4 is a schematic drawing showing another information distribution system of the present invention.

FIG. 4 is a schematic diagram of another information distribution system of the present invention. Similar elements in FIGS. 1 and 4 have the same reference numerals. In FIG. 4, a plurality of CDs (such as CDs 152 and 154) encoded with the above described information are distributed to subscriber units 102 and 104. Instead of antennas and transponder interfaces, subscriber units 102 and 104 contains CD readers (such as CD reader 156).

Current technology allows the size of antenna 116 to be as small as 2 feet. The costs of antenna 116 and transponder interface 132 are already low enough to be within the reach of small business or a typical household. The newspaper publisher has to pay for the use of the transponder. However, the costs are comparable to the printing and distribution costs of printed newspaper. It is anticipated that the costs of the newspaper distribution system in accordance with the present invention will be lowered as the number of subscribers increases.

Figure 3:
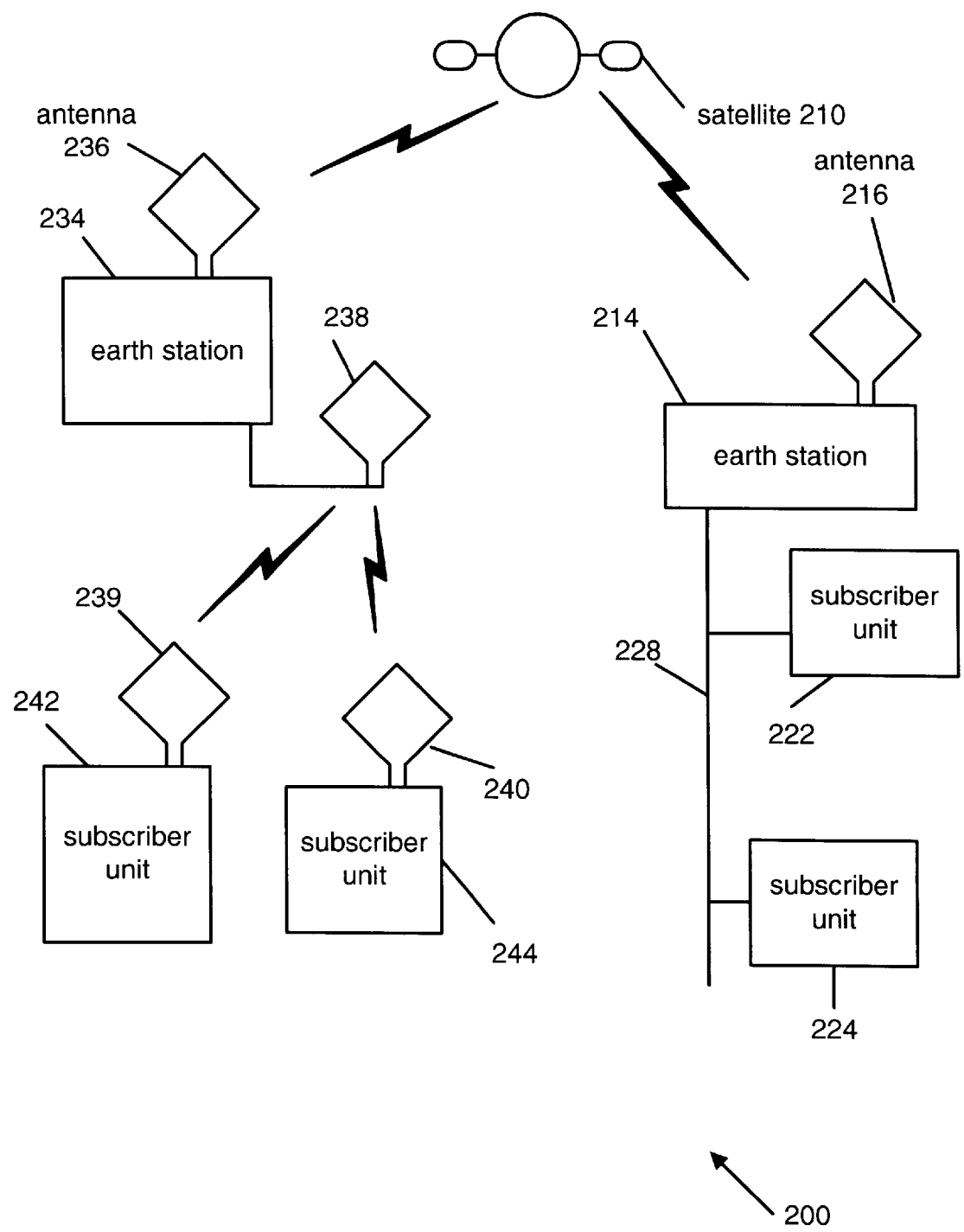
FIG. 3 shows another embodiment of the information distribution system of the present invention.

FIG. 3 shows another embodiment of a newspaper distribution system 200 of the present invention. System 200 contains a satellite transponder 210, an earth station 214, and a plurality of subscriber units, such as units 222 and 224. Transponder 210 functions in a similar way as transponder 110 of FIG. 1 and subscriber units 222 and 224 function in a similar way as subscriber units 102 and 104 of FIG. 1. Earth station 214 receives digital data transmitted by transponder 210 using an antenna 216. The data is distributed to subscriber units 222 and 224 via wired communication channel 228, such as cable and optic fiber. Other earth stations could be placed in strategic locations throughout the country to serve their respective subscribers in a similar manner as earth station 214 and subscriber units 222 and 224. As a result, a large geographic area can be served simultaneously by satellite transponder 210. The advantage of this embodiment is that the equipment costs incurred by the subscriber units are low.

In some locations, it may not be desirable to use wired communication channel to link an earth station to subscribers. In such case, wireless communication channel could be used. FIG. 3 shows an earth station 234 that receives transponder signal from transponder 210 using an antenna 236. Earth station 234 in turn broadcasts the digital data to its subscribers, such as subscriber units 242 and 244.

In one embodiment of system 200, teletext technology is used to link earth station 234 and subscriber units 242 and 244. Thus, earth station 234 could be located adjacent to a television transmission station. The digital data received by earth station 234 can be integrated to the vertical blanking interval of a TV signal, which is broadcasted using an antenna 238. Subscriber units 242 and 244 receive the signal using antennas 239, and 240, respectively. The digital data is then retrieved. Various improvements and refinements of the teletext technology are well known and can be incorporated into system 200.

It should be obvious to a person skilled in the art that systems 100 and 200 are not limited to the distribution of newspaper. Further, electronic newspapers of the future may contains contents which are not available in the printed version, such as video and other multimedia compositions. Other information, such as magazines, graphic images, electronic mails, computer games, multimedia work, or interactive movie, could also be advantageously distribution using a system similar to systems 100 and 200. For example, if it is desirable to distribute interactive movie, the non-interactive portion can be broadcasted while the interactive portion is delivered using a bi-directional channel.

There has thus shown and described a novel information distribution system. Many changes, modifications, variations and other uses and applications of the subject invention will become apparent to those skilled in the art after considering this specification and the accompanying drawings. All such changes, modifications, variations, uses, and applications are covered by the scope of this invention which is limited only by the appended claims.

I claim:

1. A method for distributing digital data to a plurality of remote sites each having a processing device and a display device, comprising the steps of:

generating a first set of digital data;

encoding each of a plurality of portable read-only storage devices with said first set of digital data;

distributing said plurality of storage devices to said plurality of remote sites;

providing a database containing a second set of digital data and remotely communicating with said sites using communication channels;

said first set of digital data comprising a first set of displayable data, a plurality of formatting codes, a second set of displayable data, a first non-displayable data, a non-displayable first linkage reference, and a second non-displayable data, said second set of displayable data being highlighted when displayed by said display device, said first non-displayable data being used by said processing device for recognizing said second set of displayable data, said second non-displayable data being used by said processing device for recognizing said first linkage reference, said first linkage reference being used for retrieving a portion of said second set of digital data, and said second set of displayable data being associated with said first linkage reference;

receiving said first linkage references transmitted by at least one of said sites using said communication channels;

searching, by said database, for said portion of said second set of digital data referenced by said first linkage reference when said second set of displayable digital data is selected by a user in said at least one of said sites; and sending, by said database, said portion to said at least one of said remote sites via said communication channels.

2. The method of claim 1 wherein said first set of digital data is encrypted.

3. The method of claim 1 wherein said storage devices are CDROMs.

4. The method of claim 1 wherein said storage devices are optically encoded storage devices.

5. The method of claim 1 wherein said database contains a third set of digital data, wherein said second set of digital data comprises a second linkage reference associated with said third set of digital data, said method further comprising a step of searching said database in response to said second linkage reference.

6. The method of claim 1 further comprising the step of periodically updating parts of said second set of digital data.

7. The method of claim 1 wherein said second set of displayable data is enclosed between a pair of said first non-displayable data and said first linkage reference is enclosed between a pair of said second non-displayable data.

8. An information distribution system for distributing digital data to be displayed in a plurality of remote sites each having a processing device and a display device, comprising:

a plurality of portable read-only storage devices each encoded with a first set of digital data, said storage devices being distributed to said plurality of remote sites;

a database containing a second set of digital data and remotely communicating with said sites using communication channels;

said first set of digital data comprising a first set of displayable data, a plurality of formatting codes, a second set of displayable data, a first non-displayable data, a non-displayable first linkage reference, and a second non-displayable data, said second set of displayable data being highlighted when displayed by said display device, said first non-displayable data being used by said processing device for recognizing said second set of displayable data, said second non-displayable data being used by said processing device for recognizing said first linkage reference, said first linkage reference being used for retrieving a portion of said second set of digital data, and said second set of displayable data being associated with said first linkage reference;

said database receiving said first linkage reference delivered by at least one of said remote sites; and means in said database for searching said portion of said second set of digital data referenced by said first linkage reference and for sending said portion to said at least one remote sites via at least one of said communication channels.

9. The system of claim 8 wherein said storage devices are CDROMs.

10. The system of claim 8 wherein said read-only storage devices are optically encoded storage devices.

11. The system of claim 8 wherein said database contains a third set of digital data, wherein said second set of digital data comprises a second linkage reference associated with said third set of digital data, and wherein said means for searching further searches said database in response to said second linkage reference.

12. The system of claim 8 further comprising means for periodically updating parts of said second set of digital data.

13. The system of claim 8 wherein said second set of displayable data is enclosed between a pair of said first non-displayable data and said first linkage reference is enclosed between a pair of said second non-displayable data.

14. The system of claim 8 wherein said first set of digital data is encrypted.

15. A plurality of portable read-only storage devices distributed to a plurality of remote sites, each of said plurality of remote sites having a processing device and a display device, each of said plurality of remote sites further connected via a bi-directional channel to a database containing a first set of digital data; each of said storage devices comprising a second set of digital data having a plurality of regular displayable items, a plurality of formatting codes, a plurality of special displayable terms, a first non-displayable symbol, a plurality of linkage references, and a second non-displayable symbol, said special displayable terms being highlighted when displayed by said display device, said first non-displayable symbol being used by said processing device for recognizing said displayable terms, said second non-displayable symbol being used by said processing device for recognizing said plurality of linkage references, each of said plurality of linkage references being used for retrieving a portion of said first set of digital data, and each of said plurality of special displayable terms being associated with one of said plurality of linkage references.

16. The storage devices of claim 15 wherein each of said plurality of special displayable terms are enclosed between a pair of said first non-displayable symbol and each of said plurality of linkage references are enclosed between a pair of said second non-displayable symbol.

17. A method for distributing digital data via communication channels to a plurality of remote sites each having a processing device, a nonvolatile memory, and a display device, comprising the steps of:

generating a first set of digital data;

encoding each of a plurality of portable read-only storage devices with said first set of digital data;

distributing said plurality of storage devices to said plurality of remote sites;

providing a database containing a second set of digital data, said database accessible by said plurality of remote sites via said communication channels;

said first set of digital data comprising a set of displayable data and a first linkage reference associated with said set of displayable data, said set of displayable data transferable to said nonvolatile memory and displayable on said display device, said first linkage reference transferable to said nonvolatile memory but not displayable on said display device, said first linkage reference being transmitted to said database via said communication channels when said set of displayable data is selected by a user in at least one of said plurality of sites;

accepting by said database said first linkage reference originated from said at least one of said plurality of sites;

searching, by said database, for a portion of said second set of digital data referenced by said first linkage reference; and sending, by said database, said portion to said at least one of said plurality of sites via said communication channels.

18. The method of claim 17 wherein said first set of digital data is encrypted.

19. The method of claim 17 wherein said storage devices are CDROMs.

20. The method of claim 17 wherein said storage devices are optically encoded storage devices.

21. The method of claim 17 wherein said database contains a third set of digital data, wherein said second set of digital data comprises a second linkage reference associated with said third set of digital data, said method further comprising a step of searching said database in response to said second linkage reference.

22. The method of claim 17 further comprising the step of periodically updating parts of said second set of digital data.

23. The method of claim 17 wherein said first linkage reference is enclosed between a pair of non-displayable data.

24. An information distribution system for distributing digital data via communication channels to a plurality of remote sites each having a processing device, a nonvolatile memory, and a display device, comprising:

a plurality of portable read-only storage devices each encoded with a first set of digital data, said storage devices being distributed to said plurality of remote sites;

a database containing a second set of digital data and remotely communicating with said sites using said communication channels;

said first set of digital data comprising a set of displayable data and a first linkage reference associated with said set of displayable data, said set of displayable data transferable to said nonvolatile memory and displayable on said display device, said first linkage reference transferable to said nonvolatile memory but not displayable on said display device, said first linkage reference being transmitted to said database via said communication channels when said set of displayable data is selected by a user;

said database receiving said first linkage reference delivered by at least one of said plurality of sites; and means in said database for searching for a portion of said second set of digital data referenced by said first linkage reference and for sending said portion to said at least one site via said communication channels.

25. The system of claim 24 wherein said storage devices are CDROMs.

26. The system of claim 24 wherein said read-only storage devices are optically encoded storage devices.

27. The method of claim 24 wherein said database contains a third set of digital data, wherein said second set of digital data comprises a second linkage reference associated with said third set of digital data, said wherein said means for searching further searches said database in response to said second linkage reference.

28. The system of claim 24 further comprising means for periodically updating parts of said second set of digital data.

29. The method of claim 24 wherein said first linkage reference is enclosed between a pair of non-displayable data.

30. The system of claim 24 wherein said first set of digital data is encrypted.

31. A method for distributing a first set of digital data stored in a database to a remote site having a display device, comprising:

providing said remote site with a portable read-only storage device encoded with a second set of digital data;

providing said remote site with a processing device comprising a nonvolatile memory unit for storing at least a portion of said second set of digital data, said portion comprising a first set of displayable data, a second set of displayable data, and a non-displayable linkage reference associated with said second set of displayable data and said first set of digital data; and receiving, at said remote site and subsequent to both of said providing steps, said first set of digital data, said receiving step comprising:
    allowing a user to select said second set of displayable data;
    subsequent to said selection, extracting said linkage reference; and
    transmitting said extracted linkage reference to said database through a bi-directional channel; and
    receiving said first set of digital data from said database through said bi-directional channel.

32. The method of claim 31 wherein said storage devices are CDROMs.

33. The method of claim 31 wherein said storage devices are optically encoded storage devices.

34. The method of claim 31 wherein said second set of digital data further comprises video data.

35. The method of claim 31 wherein said second set of digital data further comprises a computer game.

36. The method of claim 1 wherein said first set of digital data further comprises video data.

37. The method of claim 1 wherein said first set of digital data further comprises a computer game.

38. The method of claim 8 wherein said first set of digital data further comprises video data.

39. The method of claim 8 wherein said first set of digital data further comprises a computer game.

40. The method of claim 15 wherein said first set of digital data further comprises video data.

41. The method of claim 15 wherein said first set of digital data further comprises a computer game.

42. The method of claim 17 wherein said first set of digital data further comprises video data.

43. The method of claim 17 wherein said first set of digital data further comprises a computer game.

44. The method of claim 24 wherein said first set of digital data further comprises video data.

45. The method of claim 24 wherein said first set of digital data further comprises a computer game.

46. A method for distributing a first set of digital data stored in a database to a plurality of remote sites each having a display device and a communication channel, comprising the steps of:

providing each of said plurality of remote sites with a portable read-only storage device encoded with a second set of digital data;

providing each of said plurality of remote sites with a processing device comprising a nonvolatile memory unit for storing at least a portion of said second set of digital data, said portion comprising a first set of displayable data, a second set of displayable data, a first non-displayable data indicating a presence of said second set of displayable data, a non-displayable first linkage reference associated with said second set of displayable data and said first set of digital data; and receiving, by at least one of said remote sites and subsequent to both said providing steps, said first set of digital data, comprising the steps of:
    allowing a user in said at least one of said remote sites to select said second set of displayable data;
    extracting said first linkage reference after said user selected said second set of displayable data;
    transmitting said extracted first linkage reference to said database through said communication channel; and
    receiving said first set of digital data from said database through said communication channel.

47. The method of claim 46 wherein said storage devices are optically encoded storage devices.

48. The method of claim 46 wherein said second set of digital data further comprises video data.

49. The method of claim 46 wherein said second set of digital data further comprises a computer game.

50. The method of claim 46 wherein said database contains a third set of digital data, wherein said first set of digital data comprises a second linkage reference associated with said third set of digital data.

51. The method of claim 46 wherein said portion further comprises a second non-displayable data indicating a presence of said first linkage reference.

* * * * *

(12) EX PARTE REEXAMINATION CERTIFICATE (5459th)
United States Patent
Chan

(10) Number: US 6,314,574 C1
(45) Certificate Issued: *Jul. 25, 2006

(54) INFORMATION DISTRIBUTION SYSTEM

(75) Inventor: Hark Chan, Cupertino, CA (US)

(73) Assignee: Techsearch, L.L.C., Northbrook, IL (US)

Reexamination Request:
No. 90/006,933, Feb. 11, 2004

Reexamination Certificate for:
Patent No.: 6,314,574
Issued: Nov. 6, 2001
Appl. No.: 09/188,157
Filed: Nov. 8, 1998

(*) Notice: This patent is subject to a terminal disclaimer.

Related U.S. Application Data

(63) Continuation-in-part of application No. 08/939,368, filed on Sep. 29, 1997, now Pat. No. 6,021,307, which is a continuation-in-part of application No. 08/644,838, filed on May 10, 1996, now abandoned, which is a continuation-in-part of application No. 08/279,424, filed on Jul. 25, 1994, now abandoned, which is a continuation-in-part of application No. 08/255,649, filed on Jun. 8, 1994, now abandoned.

(51) Int. Cl.
*H04H 1/00* (2006.01)

(52) U.S. Cl. .................................. 725/66; 725/110
(58) Field of Classification Search ............. None
See application file for complete search history.

(56) References Cited

U.S. PATENT DOCUMENTS

| | | | |
|---|---|---|---|
| 4,215,406 A | 7/1980 | Gomola et al. |
| 4,430,639 A | 2/1984 | Bennett |
| 4,442,502 A | 4/1984 | Friend et al. |
| 4,556,904 A | 12/1985 | Monat |
| 4,694,490 A | 9/1987 | Harvey et al. |
| 4,768,087 A | 8/1988 | Taub et al. |
| 4,835,683 A | 5/1989 | Phillips |
| 4,873,662 A | 10/1989 | Sargent |
| 4,877,404 A | 10/1989 | Warren et al. |
| 4,899,292 A | 2/1990 | Montagna et al. |
| 5,058,000 A | 10/1991 | Cox |
| 5,124,909 A | 6/1992 | Blakely |
| 5,155,847 A | 10/1992 | Kirouac et al. |
| 5,157,783 A | 10/1992 | Anderson et al. |
| 5,241,671 A | 8/1993 | Reed et al. |
| 5,265,065 A | 11/1993 | Turtle |
| 5,381,476 A | 1/1995 | Kimoto et al. |
| 5,384,835 A | 1/1995 | Wheeler et al. |
| 5,418,948 A | 5/1995 | Turtle |
| 5,488,725 A | 1/1996 | Turtle |
| 5,506,984 A | 4/1996 | Miller |
| 5,519,866 A | 5/1996 | Lawrence |
| 5,528,490 A | 6/1996 | Hill |
| 5,530,740 A | 6/1996 | Irribarren |
| 5,543,789 A | 8/1996 | Behr et al. |

(Continued)

OTHER PUBLICATIONS

Laura Fillmore, "Internet Publishing: How We Must Think," Dec. 7, 1993.
Gary Baker, "The Mac Internet Tour Guide," Jan. 1994.
Joseph Germain, "Citations from Engineering Index: EIX," Jan. 28, 2002.
"Getting Multimedia From a Kit," May 1993.

(Continued)

*Primary Examiner*—Quochien B. Vuong

(57) ABSTRACT

An information distribution system encodes a first set of digital data on a plurality of portable read-only storage devices. Additional information is stored in a database that is accessible by using a bi-directional channel. The first set of digital data contains a plurality of special displayable terms, a first non-displayable symbol, a plurality of linkage references, and a second non-displayable symbol. A user can select at least one special displayable term. The linking reference associated with the selected special displayable term is sent to the database via the bi-directional channel. The database uses the linking reference to search for information, and returns the resulting information to the user.

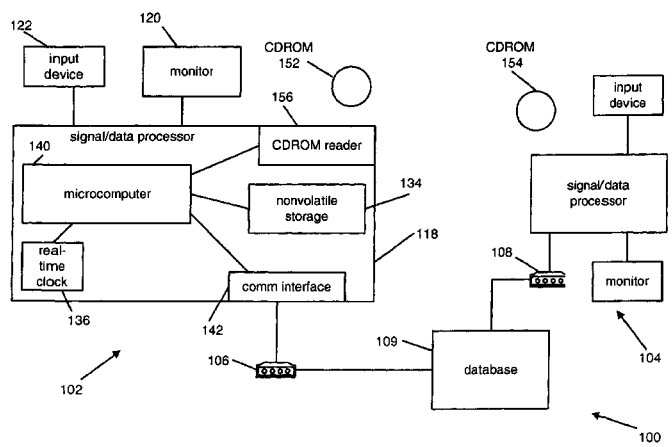

U.S. PATENT DOCUMENTS

| | | | |
|---|---|---|---|
| 5,555,407 A | 9/1996 | Cloutier et al. | |
| 5,559,936 A | 9/1996 | Poulter et al. | |
| 5,563,946 A | 10/1996 | Cooper et al. | |
| 5,592,551 A | 1/1997 | Lett | |
| 5,613,004 A | 3/1997 | Cooperman et al. | |
| 5,640,192 A | 6/1997 | Garfinkle | 348/1 |
| 5,668,592 A | 9/1997 | Spaulding | |
| 5,668,950 A | 9/1997 | Kikuchi et al. | |
| 5,694,546 A | 12/1997 | Reisman | |
| 5,721,827 A | 2/1998 | Logan | |
| 5,754,864 A | 5/1998 | Hill | |
| 5,757,913 A | 5/1998 | Bellare et al. | |
| 5,761,649 A | 6/1998 | Hill | |
| 5,819,034 A | 10/1998 | Joseph et al. | |
| 5,933,604 A | 8/1999 | Inakoshi | 395/200.56 |
| 5,954,793 A | 9/1999 | Stutman | |
| 5,961,593 A | 10/1999 | Gabber et al. | 709/219 |
| 5,968,129 A | 10/1999 | Dillon et al. | 709/233 |
| 5,970,471 A | 10/1999 | Hill | |
| 5,999,525 A | 12/1999 | Krishnaswamy | |
| 6,029,142 A | 2/2000 | Hill | |
| 6,044,365 A | 3/2000 | Cannon et al. | |
| 6,089,453 A | 7/2000 | Kayser | |
| 6,125,388 A | 9/2000 | Reisman | |
| 6,131,088 A | 10/2000 | Hill | |
| 6,253,059 B1 | 6/2001 | Chan | 340/7.21 |
| 6,289,200 B1 | 9/2001 | Chan | 370/352 |
| 6,314,574 B1 | 11/2001 | Chan | 725/110 |
| 6,317,785 B1 | 11/2001 | Chan | 709/219 |
| 6,339,693 B1 | 1/2002 | Chan | 455/3.01 |
| 6,343,380 B1 | 1/2002 | Chan | 725/105 |
| 6,347,215 B1 | 2/2002 | Chan | 348/468 |
| 6,349,409 B1 | 2/2002 | Chan | 725/105 |

OTHER PUBLICATIONS

Brian Weinert, "CD–Rom Technology, Past, Future," Jan. 23, 2002.
"History of Ovid Technologies," Feb. 5, 2002.
Marc Andreessen, "New X–based Information Systems Browser Available," Feb. 16, 1993.
C. Brown, "Net 286 Gazette Online Magazine," Sep. 25, 1993.
Gail L. Bower, "CD–Rom, EDI, and POS: Powercom–2000," Jul./Aug. 1994.
Mary Ann O'Connor, "Markup, SGML, and Hypertext for Full–Text Databases—Part III," Nov. 1992.
"Online or Ondisc? When to Choose CD–ROM for your Database," Mar. 1993.
Ogawa et al., "Design Strategies for Scenario–based Hypermedia: Description of its Structure, Dynamics, and Style," Nov. 30–Dec. 4, 1992.
Clay Andres, "Authoring Tools Help Developers Deliver Multimedia Message on CD," Dec. 6, 1993.
Anita Malnig, "Customers Build Their Own Mine Vehicles Via Multimedia," Jul. 26, 1993.
Walnut Creek CD–ROM, FreeBSD (FCD) and related documentation, May 1994.
NFL Pro League Football, "Keyboards Dream Teams," sec. BONUS, p. 4E, Aug. 30, 1991.
British National Libraries Project.
Law Technology Journal, The Link Between CD–Rom and Online, vol. 2, No. 2, May 1993, at 13. (Justis Article).
Kime H. Smith, Jr., "Accessing Multimedia Network Services," May 1992.
Alta Oben, "Review of Nautilus from May 1995 Monitor," Feb. 27, 2002.
Scot P. Rogers, "Citations from INFORM:INF," Feb. 5, 2002.
Scot P. Rogers, "Citations from PROMT–PREDICASTS: PM3," Feb. 5, 2002.
Charles Bermant, "Enhanced CD's Promise to Redefine Liner Notes," Feb. 20, 2002.
"Web/CD–ROM Hybrids, A Working Definition," Feb. 1, 2002.
Richard R. Reisman, "CD–ROM/Online Hybrids, The Missing Link?" Jan. 24, 2002.
"Connect with Nautilus CD," Jun. 1994.
John Pierson, "Gatekeeper and Mosaic".
Josephine M. Bettany, "Creating the Hypertext Cluster," Mar. 21, 2002.
Kathryn Nesbit, "BRS/Links to the Future: Online Hypertext is Born," May 1990.
Theodor Holm Nelson, "Literary Machines 90.1," 1990.
Laurie Flynn, "CD–ROMs: They're Not Just for Entertainment," Apr. 24, 1994.
Jakob Nielsen, "Hypertext and Hypermedia," 1993.
Gord Nickerson, "Mining for Gold," Jan. 1994.
Gunnar Liestol, "Hypermedia Communication and Academic Discourse: Some Speculations on a Future Genre, 1993".
Michael Mascha, "Interactive Education: Transitioning CD–ROMs to the Web," Nov. 1994.
"First International Conference On The World–Wide Web," May 25–27, 1994.
"Information Today," Feb. 1988.
Noam Chomsky, "Online or Ondisc? When to Choose CD–ROM for your Database," Mar. 1993.
"Dialog OnDisc Links: CD–ROM and Online Providing a Complementary Service," Jun. 1989.
Mazur, et al., "Joining Digital Hypermedia and Networking for Collaboration In Engineering Design: A Project's Early Consideration," Mar. 1992.
Gautier, et al., "Automatic Program Recording System," Radiodiff et TV, Nov. 1975.
Apple Computer, Inc., AppleLink 6.1 and related documentation, Jun. 1991.
Michael Mascha and Gary Seaman, "Interactive Education: Transitioning CD–ROMs to the Web," May 25–27, 1994 (Virtual Chimps).
Intuit, Inc., Packet Drivers CD (Packet Drivers or PCD) and related documentation, Jan. 1994.
Scot P. Rogers, "Citations from Business Dateline Thru 1998: BD1," Feb. 5, 2002.
David Raggett, WWW Discussion Group Request for Comments, "HTML (Hypertext Markup Language)," Jul. 12, 1993.
Apple InfoMACIII compilation CD–ROM produced by Defendant Casio, Inc., in the actions styled *Hark Chan* v. *Brother International Corp., et al.*, Case No. C 03–2694 VRM (N.D. Cal.) (The CD is essentially a compilation of various freeware and shareware programs, which Casio alleges "comprises a collection of software and data containing links allowing access to online features.").
AppleLink 6.1 and related documentation, Jun. 1991, by Apple Computer, Inc.
Symantec Antivirus for Macintosh 4.0 and related documentation (SAM 4.0).
Bain, G. Donald, "Pinpointing Differences Between Atlas Pro, Mapinfo." *MacWeek*, vol. 6 (Mar. 9, 1992), p. 32.

Barr, Christopher, "On–line to Tomorrowland," *PC Magazine,* (Jan. 25, 1994), p. 30.

Barr, Christopher, "By? Hold? Self? MarketArts Windows on Wall Street." *PC Magazine,* vol. 13, No. 11, (Jun. 14, 1994), p. 30.

Bryant, Gayle, "Combining Online and Disc." *Online & CD–ROM Review,* vol. 17, No. 6 (Dec. 1993), pp. 386–398.

"Microsoft Continues Home Momentum With Nine New Products; Showcases New Products and Previews First Online Enhancement to CD–ROM Product." *Business Wire,* (Mar. 1, 1994).

"CD–ROM With baseball Daily Online To Hit Stores as Microsoft Home's First Complete Sports Software; Comprehensive, Multimedia Guide to America's Favorite Pastime Is an Official Publication of Major League Baseball." *Business Wire,* (Jun. 10, 1994).

Griffith, Cary, "The Federal Register On CD–ROM." *Information Today,* vol. 9, No. 11, (Dec. 1992), pp. 32–34.

"Automatic Hypermedia Link Generation" *IBM Technical Disclosure Bulletin,* vol. 35, No. 1A, (Jun. 1992), pp. 447–448.

"Fully Digital GML based Authoring and Delivering System for Hypermedia." *IBM Technical Disclosure Bulletin,* vol. 35, No. 2, (Jul. 1992), pp. 458–463.

"Local Area Network Program Distribution Facility." *IBM Technical Disclosure Bulletin,* vol. 33, No. 5, (Oct. 1990), pp. 169–171.

"S&P And Dialog Introduce Company Information On CD–ROM; Standard & Poor's Corp., CD–ROM Disc." *Information Today,* vol. 5, No. 6, (Jun. 1988), p. 22.

"FT adds features, loses manager." *Information World Review,* No. 84 (Sep. 1993).

"Reviews/Products Comparison." *InfoWorld,* (Dec. 7, 1992), p. 86–.

Keizer, Gregg, "MECA's Managing Your Money Breaks Into The Windows Market." *PC Magazine,* vol. 13, No. 12, (Jun. 28, 1994), p. 37.

Keizer, Gregg, "Digital Dollars & Silicon Cents." PC Magazine, (Jan. 25, 1994), pp. 235–244.

Leitzke, Ron, "On–Line Information Goes Off–Line, Too." *Columbus Dispatch,* (Jun. 3, 1994).

"Database Management." *MacUser,* vol. 8, No. 13, (Jan. 1993), p. 103–.

Mann, Richard, "Quicken 3 For Windows; Productivity Choice; Software Review; Evaluation." *Computel,* vol. 16, No. 4, (Apr. 1994), p. 76.

Marcus, John, "Wilson Business Abstracts On CD–Rom for the Corporate Library." *Database,* vol. 17, No. 3, (Jun. 1994), pp. 52–55.

Parkinson, Kirsten L., "NautilusCD Adds Magazine–Like Interface; Product Announcement," *MacWeek,* vol. 7, No. 41, (Oct. 18, 1993), p. 12.

"CompuServe Incorporated and Metatec Corporation Announce Strategic Alliance." *PR Newswire,* (Sep. 20, 1993).

"New CompuServe CD–ROM Brings the Power of Multimedia to Online Computing." *PR Newswire,* (Jun. 1, 1994).

Salamone, Salvatore, "Electronic Software Distribution: Diamond in the Rough." *Data Communications,* (Mar. 1993), pp. 109–116.

Simon, Barry, "Pipeline: Enter the Internet." *PC Magazine,* (Feb. 8, 1994), p. 46.

Slay, Alan L., "Money Management Cures." *Macworld* (Mar. 1991), pp. 152–158.

Steinberg, Jeffrey A., "GeoQuery." *MacUser,* vol. 8, No. 10, (Oct. 1992), p. 58.

Sugawara, Sandy, "Microsoft's very big ballpark estimate: Software giant's 'complete baseball' opens a window on its ambitious on–line plans." *Washington Post,* (May 7, 1994).

Vaughn, Mary A.; Warnick, Brad, "Publishing on CD–ROM: The NautilusCD Experience." CD–ROM Professional, vol. 7, No. 3, (May/Jun. 1994), pp. 59–68.

Sjoerd Vogt, "CD–ROM and Online–Competitors or Compatriots? An Online Host's Point of View," Online Information 92 at 33 (David I. Raitt ed., 16th International Online Information Meeting Proceedings, London, Dec. 8–10, 1992).

"Column: Windows Analytics." *Wall Street & Technology.*

Unknown Article. *Wall Street & Technology.*

Microsoft Complete Baseball (Complete Baseball) and related documentation, May 1994.

ViolaWWW and related documentation, developed by Pei Wei and released for public use in May 1992.

"Exploring Hybrid World of CD–ROM/On–Line Products," Multimedia Week, vol. 3, No. 10, Mar. 7, 1994 (Phillips Multimedia).

Dialog OnDisc. And related documentation, Jan. 1993, Dialog Corp.

CCH Access (CCH, Inc.) and related documentation, 1993.

Packet Drivers CD (Packet Drivers or PCD) and related documentation, approximately Jan. 1994, Inuit, Inc.

Quicken Deluxe product (Quicken Deluxe)and related documentation, approximately Jan. 1994, Intuit, Inc.

Reality's "Wealth Builder 3.0 by Money Magazine," User's Guide (1992).

DISCC.

Symantec Antivirus for Macintosh 4.0 and related documentation (SAM 4.0).

Packet.h.

Money 3.0 Various Documents.

"Microsoft CD–Rom Yearbook: 1989–1990." Microsoft, (1990), pp. 163–170.

Paul D. Warner, "Tax Services and Tax Forms on CD–ROM," CPA Journal, Nov. 1993, at 48.

"The Link Between CD–ROM and Online, Law Technology Journal," vol. 2, No. 2, May 1993, at 13 (Justis Article).

British National Libraries Project.

Dialog on Disc; and related demonstrations (Jan. 1993) Dialog Corp.

Internet Info CD, Mar. 1994, Walnut Creek CD–Rom.

FreeBSD (FCD) and related documentation, May 1994, Walnut Creek CD–ROM.

CompuServe CD (CCD) and related documentation, May 1994, CompuServe.

"Keyboards Dram Teams," sec. BONUS, p. 4E, Aug. 30, 1991 (NFL Pro League Football).

"You Can Be the Manager with These Baseball Games," Toronto Star, sec. LIFE, p. F4, Aug. 31, 1991 (Earl Weaver Baseball).

Warner, Jack, "Sports Computer Games; Several new football games out." *The Atlanta Journal and Constitution,* (Nov. 17, 1991).

Murray, Rink, "Earl Weaver Baseball II; Software Review; one of four baseball simulation games reviews in '386 Down the Power Alleys." *PC Magazine,* vol. 11, No. 8, (Apr. 28, 1992), p. 493.

Scisco, Peter, "Pigskin preview; computer football games; Software Review; Evaluation." *Computel*, vol. 14, No. 8, (Sep. 1992), p. 92.

File Folder—PR 125 A112 Apple Computer Inc.—Letter and Encrypted Software Distribution and Vending Agreement.

Scenarios 1–6 and SAM Screen Captives.

West Premise.

ViolaWWW and related documentation developed by Pei Wei and released for public use in May 1992.

Nickerson, Gordon, "WorldWideWeb," Computers in Libraries, vol. 12, No. 11, p. 75, (Dec. 1992) (hereinafter "*WorldWideWeb*") (Tab No. 6).

Marshall, Patrick, "Multimedia Software; Microsoft Knows Multimedia and Flaunts it with Encarta CD–ROM," InfoWorld, p. 113 (Apr. 9, 1993) (hereinafter "*Encarta CD–ROM*") (Tab No. 8).

Quint, Barbara, "Footsore Searcher Tours Online/CD–ROM '91 Exhibits: 'Day Three,'" Database Searcher, vol. 8, No. 2, p. 10, (Feb. 1992) (hereinafter "*Online/CD–ROM '91*") (Tab No. 9).

Rubenstein, Robert, and Wasserman, William, "CD–ROM Update: Tax Information of CD–ROM," The Tax Adviser, No. 1, Vol. 24, p. 59, (Jan. 1993) (hereinafter "*CD–ROM Update*".) (Tab No. 10).

Quint, Barbara, "Compact Cambridge/Cambridge Information Group; Cambridge Scientific Abstracts," Database Searcher, vol. 8, No. 1, p. 20, (Jan. 1992) (hereinafter "*Compact Cambridge*") (Tab No. 11).

"Library for Psychiatrists; American Psychiatric Press Inc.'s CD–ROM Library," Information Today, vol. 10, No. 6, p. 30, (Jun. 1993) (hereinafter "*Library for Psychiatrists*") (Tab No. 12).

Newcomb, Steven, Kipp, Neill, and Newcomb, Victoria, "The 'HyTime' Hypermedia/Time–based Document Structuring Language," Communications of the ACM, vol. 34, No. 11, p. 67, (Nov. 1991) (hereinafter "*'HyTime' Hypermedia*") (Tab No. 13).

Powell, James, "Adventures with the World Wide Web: Creating a Hypertext Library Information System," DATABASE, vol. 17, No. 1, p. 59 (Feb. 1994) (hereinafter "*Adventures WWW*") (Tab No. 14).

Louderback, Jim, "One man's mission: a CD ROM Drive in Every PC," PC Week, vol. 9, No. 22, p. 70 (Jun. 1992) (hereinafter "*CD ROM Drive*") (Tab No. 15).

Beiser, Karl, "What a difference a year makes: CD–ROM developments," Online, vol. 17, No. 3, p. 109 (May 1993) (hereinafter "*CD–ROM Developments*") (Tab No. 16).

Nicholls, Paul, "Assessing CD–ROM in Canada," CD–ROM World, vol. 8, No. 5, p. 38 (Jun. 1993) (hereinafter "*Assessing CD–ROM*") (Tab No. 17).

Kobielus, James, "Look Before Leaping Into Internet Electronic Commerce," Network World, p. 32, (Feb. 28, 1994) (hereinafter "*Look Before*") (Tab No. 18).

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–51 is confirmed.

* * * * *